United States Patent
Holmberg et al.

(10) Patent No.: US 9,512,249 B2
(45) Date of Patent: Dec. 6, 2016

(54) BIO-BASED BLOCK POLYMERS DERIVED FROM LIGNIN AND FATTY ACIDS

(71) Applicants: Angela L. Holmberg, Newark, DE (US); Joseph F. Stanzione, Wilmington, DE (US); Richard Wool, Newark, DE (US); Thomas H. Epps, III, Bear, DE (US)

(72) Inventors: Angela L. Holmberg, Newark, DE (US); Joseph F. Stanzione, Wilmington, DE (US); Richard Wool, Newark, DE (US); Thomas H. Epps, III, Bear, DE (US)

(73) Assignee: University of Delaware, Newark, DE (US)

(*) Notice: Subject to any disclaimer, the term of this patent is extended or adjusted under 35 U.S.C. 154(b) by 0 days.

(21) Appl. No.: 14/200,855

(22) Filed: Mar. 7, 2014

(65) Prior Publication Data

US 2014/0275435 A1 Sep. 18, 2014

Related U.S. Application Data

(60) Provisional application No. 61/789,490, filed on Mar. 15, 2013.

(51) Int. Cl.
*C08F 12/24* (2006.01)
*C08F 212/14* (2006.01)
*C08L 25/18* (2006.01)
*C08F 293/00* (2006.01)
*C08F 290/06* (2006.01)

(52) U.S. Cl.
CPC .............. *C08F 12/24* (2013.01); *C08F 212/14* (2013.01); *C08F 293/005* (2013.01); *C08L 25/18* (2013.01); *C08F 290/06* (2013.01)

(58) Field of Classification Search
CPC ......... C08F 12/24; C08F 18/12; C08F 212/14; C08F 218/12; C08F 293/005; C08L 25/18; C08L 31/02
See application file for complete search history.

(56) References Cited

U.S. PATENT DOCUMENTS

| | | | |
|---|---|---|---|
| 6,121,398 A | 9/2000 | Wool et al. | |
| 7,524,909 B2 | 4/2009 | Palmese et al. | |
| 2007/0269480 A1* | 11/2007 | Richard et al. | ............... 424/423 |
| 2012/0295993 A1 | 11/2012 | Wool | |
| 2013/0337711 A1 | 12/2013 | Wool | |

OTHER PUBLICATIONS

Rojo, L., et al.; Journal of Materials Science: Materials in Medicine, vol. 19, 2008, p. 1467-1477.*
Glasser, W.G., et al.; ACS Symposium Series, Lignin: Properties and Materials, Chapter 41, 1989, p. 515-522.*
Brydson, J.A., et al.; Plastics Materials, 1995, p. 56-61.*
Mather, B.D.; Non-Covalent Interactions in Block Copolymers Synthesized via Living Polymerization Techniques, 2007, p. i-566.*
Lewis, C.L.; Structure Property Relationship for Polymers Bearing Reversibly Associating Side-groups, 2014, p. i-237.*
Anthamatten, M., et al.; Macromolecules, 2014, p. 729-740.*
Beach, et al.; *Properties of Thermosets Derived From Chemically Modified Triglycerides and Bio-Based Comonomers*; Applied Sciences, 2013, 3, 684-693; doi: 10.3390/app3040684; ISSN 2076-3417.
Stanzione, et al; *Vanillin-Based Resin for Use in Composite Applications*; Green Chemistry, 2012, 14, 2346-2352.
Stanzione, et al; *Lignin Model Compounds as Bio-Based Reactive Diluents for Liquid Molding Resins*; ChemSusChem, 2012, 5 1291-1297.
Stanzione, et al.; *Lignin-Based Bio-Oil Mimic as Biobased Resin for Composite Applications*; ACS Sustainable Chemistry & Engineering, 2013, 1, 419-426.

\* cited by examiner

*Primary Examiner* — Robert Jones, Jr.
(74) *Attorney, Agent, or Firm* — RatnerPrestia

(57) ABSTRACT

The present invention pertains to bio-based block polymers synthesized from functionalized lignin-based molecules (A-monomer) and functionalized fatty acids or fatty alcohols (B-monomer) derived from plant or animal oils, waxes or fats. The block polymers can be synthesized via numerous polymerization techniques, such as reversible addition-fragmentation chain transfer (RAFT). Most importantly, this class of bio-based block polymers shows promise as providing sustainable yet scalable and tunable thermoplastic elastomers and pressure-sensitive adhesives, among other applications.

15 Claims, 3 Drawing Sheets

BIO-BASED BLOCK POLYMERS DERIVED FROM LIGNIN AND FATTY ACIDS

CROSS-REFERENCE TO RELATED APPLICATION

This application claims priority to U.S. Provisional Application No. 61/789,490, filed Mar. 15, 2013, the disclosure of which is incorporated herein by reference in its entirety for all purposes.

FEDERAL FUNDING STATEMENT

This invention was made with government support under Cooperative Agreement W911NF-06-2-001 awarded by the Strategic Environmental Research and Development Program (SERDP WP-1758) of the Department of Defense. The government has certain rights in the invention.

FIELD OF THE INVENTION

This invention pertains to block polymers synthesized from renewable resources. More specifically, the present invention pertains to block polymers synthesized from functionalized lignin-derived molecules or functionalized lignin model compounds (A-monomer) and functionalized fatty acids or functionalized fatty alcohols (B-monomer) derived from plant or animal oils, waxes, or fats.

BACKGROUND OF THE INVENTION

Block polymers have applications in thermoplastic elastomers (TPEs), pressure-sensitive adhesives (PSAs), blend compatibilizers, and devices that require phase-separated nanostructures (e.g., lithographic devices, electronic devices, photovoltaic devices, separation membranes, drug-delivery vehicles, and templates for data storage). Commonly available block polymers are petroleum-based, such as polystyrene-b-poly(methyl methacrylate), polystyrene-b-poly(isoprene), polyether-b-poly(urethane), poly(styrene-b-isoprene-b-styrene) [SIS] and poly(styrene-b-butadiene-b-styrene) [SBS]. The demand for polystyrene (PS) and PS-containing plastics, such as SIS and SBS, was approximately 24 million metric tons in 2011. The production of synthetic and natural rubbers, such as poly(isoprene) [PI], was ~14.5 million and ~11.2 million metric tons, respectively, in 2011. However, these petroleum-based polymers require hazardous monomers that should be replaced, including styrene, isoprene, butadiene, methylene diphenyl di-isocyanate, toluene di-isocyanate, and diamines that are volatile organic compounds (VOCs), hazardous air pollutants (HAPs) and/or potentially carcinogenic.

With regard to replacing petroleum-based plastics, U.S. demand for sustainable bio-based plastics is growing at 20% annually, and the turnaround times for commercializing new bio-based plastics can be rapid. For example, the initial push to commercialize poly(lactic acid) (PLA) derived from biomass (primarily from corn starch in the U.S.) began in 1997 and in 2011, approximately 140,000 metric tons of PLA were produced worldwide. Similarly, 170,000 metric tons of corn-based 1,3-propanediol for the synthesis of polytrimethylene terephthalate were produced in 2007 by DuPont Tate & Lyle Bioproducts. Numerous other bio-based plastics and bio-plastics also exist, such as polymenthide, polyhydroxyalkanoates, poly(alpha-methylene-gamma-butyrolactone), and their block polymers. However, the feedstocks for these bio-based plastics (e.g., mint, corn, sugarcane, and/or tulips), and their resulting properties, limit their commercial viability and sometimes their overall sustainability. For instance, implementing edible or presently low-volume feedstocks in commodity applications has the potential impact of reducing global food supply and available land for food production.

As a more sustainable feedstock, lignin is nature's most abundant aromatic chemical and is readily available (more than 70 million metric tons of lignin are harvested annually) as a waste product from the pulp and paper industry. Lignin is capable of yielding valuable low-molecular-weight aromatic chemicals when strategically depolymerized (e.g., vanillin from the sulfite pulping process). These aromatic chemicals may be further functionalized and polymerized. Functionalized lignin-derived molecules and/or functionalized lignin model compounds (which reproduce the lignin-derived molecules' structures and may be petroleum-based) are also referred to as lignin-based monomers. The incorporation of aromaticity in a plastic's chemical structure is known to improve overall plastic performance, such as the aromatic moiety in PS and PS-containing plastics. Thus, a lignin feedstock would require no extra land, deplete no additional resources, and avoid consumption of staple foods in the commodity production of renewable alternatives to PS and other high-performance, aromatic polymers.

In the interest of producing block polymers with rubbery segments for TPEs or PSAs, a monomer source that yields plastics softer than lignin is necessary. Polymerized derivatives of fatty acids and fatty alcohols are known to exhibit low glass transition temperatures ($T_g$'s$\approx$-50° C.) (are soft materials). These fatty-type monomers can be sourced, for example, from used cooking oils (e.g., plant oils), grease, or animal fats. It is estimated that ~3 million metric tons of used cooking oils (UCO)s and trap grease are generated annually in the U.S. alone. Over 150 million tons/year of vegetable oils are available worldwide. As a high-volume resource, fatty acids and fatty alcohols also may serve as a sustainable feedstock for bio-based block polymers.

Until now, lignin-based monomers and fatty-type monomers have not been block polymerized with each other. Between their aromatic (hard, high $T_g$) and alkane (soft, low $T_g$) character in polymerized form, using these renewable monomers as starting materials for the synthesis of block polymers provides a means for creating a wide array of tailorable, high-performance, and widely applicable sustainable plastics, especially TPEs and PSAs.

SUMMARY OF THE INVENTION

Described herein are block polymers and homopolymer macroinitiators, which enable the synthesis of block polymers, that are made from functionalized lignin-based monomers (i.e., functionalized lignin-derived monomers and/or functionalized lignin model compounds) (A-monomer) and functionalized fatty acid- or fatty alcohol-based monomers (B-monomer) derived from plant or animal oils, waxes, or fats. The block polymers can be in the form of, but are not limited to, A-B or B-A diblocks, A-B-A or B-A-B triblocks, A-B-A-B or B-A-B-A tetrablocks, and A-B-A-B-A or B-A-B-A-B pentablocks consisting of molecular strings of A and B or strings of A alternating with strings of B, and so on. The A- and B-sequences can have the same or differing lengths and molecular weights, where, in addition to the choice of monomer, the molecular weight, composition, and relative volume fractions of the A- and B-blocks define each material's thermal properties, mechanical properties, and morphology. In block polymers with multiple A-blocks and/or multiple B-blocks, the A- and/or B-block need not be identical to other A- and/or B-blocks in molecular weight, composition, functionality, polymerization method, and/or other characteristics.

One aspect of the invention provides a block polymer comprising at least one A-block and at least one B-block, wherein the A-block is a polymerized lignin-based monomer or mixture of polymerized lignin-based monomers and wherein the B-block is a polymerized fatty acid-based monomer or fatty alcohol-based monomer or mixture of polymerized fatty acid-based and/or fatty alcohol-based monomers (e.g., a mixture of two or more different fatty acid-based monomers, a mixture of two or more different fatty alcohol-based monomers, or a mixture of at least one fatty acid-based monomer and at least one fatty alcohol-based monomer).

One aspect of the invention utilizes a lignin-based monomer or combination of lignin-based monomers to prepare an A-block that is selected from the group consisting of, but not limited to, phenols, cresols, xylenols, guaiacols, catechols, eugenols, syringols, vanillin, and their acid derivatives (e.g., phenol, 2-ethylphenol, 3-ethylphenol, 4-ethylphenol, 4-propylphenol, o-cresol, m-cresol, p-cresol, 2,6-dimethylphenol, 2,4-dimethylphenol, guaiacol, creosol, 6-ethylguaiacol, 4-ethylguaiacol, 4-propylguaiacol, catechol, 6-methylcatechol, 4-methylcathecol, 6-ethylcatechol, 4-ethylcatechol, 3-methoxycatechol, isoeugenol, eugenol, syringol, vanillin, etc.). "Acid derivatives" refers to analogues and derivatives of the aforementioned compounds which contain at least one carboxylic acid (—$CO_2H$) or acid chloride (—$CO_2Cl$) group per molecule. Exemplary acid derivatives suitable for use in the present invention include vanillic acid, ferulic acid, caffeic acid, coumaric acids, and hydroxycinnamic acids. The acid derivative may, for example, comprise a benzene ring substituted with a —CH=CH—$CO_2H$ group or a —$CO_2H$ group and one or more other substituents selected from the group consisting of —OH and —$OCH_3$. The lignin-based monomers may be derived either from lignin (lignin-derived compounds) or petroleum (lignin model compounds). The lignin-based monomer or monomers are optionally functionalized with at least one moiety selected from the group consisting of, but not limited to, methacrylate, acrylate, maleic, allyl, hemiacetal, acetal, imine, amine, hydroxyl, methoxy, alkyl, alkenyl, acrylamide, cyanate ester, carboxyl, ether, carbonyl, aldehyde, azide, cyanate, isocyanate, nitrile, thiol, sulfide, disulfide, ester, sulfoxide, and epoxy groups, or combinations thereof, either prior to polymerization or post-polymerization. In one embodiment, the functional group is reacted during polymerization [e.g., chain extension of the polymer is achieved through reaction of the functional group, such as in the radical-initiated polymerization of the carbon-carbon double bond of a (meth)acrylate, maleic, allyl, alkenyl, or acrylamide functional group]. For example, one type of functionalized lignin-based monomer useful in the present invention may be a (meth)acrylated-functionalized phenolic monomer corresponding to the general formula Ar—O—C(=O)—C(R)=$CH_2$, wherein Ar is a phenyl group that is unsubstituted (i.e., $C_6H_5$—) or substituted with one or more substituents selected from the group consisting of methoxy, methyl, ethyl, and propyl and R is H or $CH_3$. Illustrative examples of such (meth)acrylated phenolic monomers include, but are not limited to, (meth)acrylated vanillin, (meth)acrylated phenol, (meth)acylated guaiacol, (meth)acrylated cresol, (meth)acrylated 4-ethylguaiacol, (meth)acrylated 4-propylguaiacol, (meth)acrylated eugenol, (meth)acrylated catechol, and (meth)acrylated 4-methylcatechol and the like and combinations thereof.

Another aspect of the invention provides a fatty acid-based or fatty alcohol-based monomer that is derived from triglycerides from animal fats, oils, or waxes; vegetable fats, oils, or waxes [e.g., soy oil, linseed oil, rapeseed (canola) oil, cottonseed oil, olive oil, corn oil, fish oil, sunflower oil, canola oil, peanut oil, coconut oil, castor oil, jatropha oil, laurel oil, palm oil, palm kernel oil, and sesame oil]; or combinations thereof.

Another aspect of the invention provides a fatty acid-based or fatty alcohol-based monomer that is derived from a fatty acid or fatty alcohol selected from the group consisting of, but not limited to, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, laccoroic acid, psyllic acid, geddic acid, ceroplastic acid, hexatriacontylic acid, ricinoleic acid, the unsaturated analogues of these acids, the saturated and unsaturated alcohols analogous to these acids (which may be obtained, for example, by reduction of the carboxylic acid group present in a fatty acid to a hydroxyl group or by conversion of a triglyceride to fatty acid methyl esters and reduction of the fatty acid methyl esters to fatty alcohols), and combinations thereof. Illustrative examples of suitable fatty alcohols include, but are not limited to, lauryl alcohol, stearyl alcohol and oleyl alcohol.

Another aspect of the invention utilizes, in the preparation of a B-block, at least one fatty acid-based and/or fatty alcohol-based monomer that comprises a hydrocarbon chain of between 1 to 36 carbon atoms and that contains at least one unsaturated carbon-carbon bond not necessarily in the hydrocarbon chain (e.g., at least one methacrylate, acrylate, maleic, allyl, or alkenyl group or combinations thereof).

Yet another aspect of the invention provides a macroinitiator for block polymer synthesis comprising (in polymerized/reacted form) either i) at least one type of lignin-based monomer and a thiocarbonylthio compound, reversible addition-fragmentation chain-transfer (RAFT) agent, or reactive moiety that can possibly permit the synthesis of block polymers or ii) at least one type of renewable fatty acid-based monomer or at least one type of renewable fatty alcohol-based monomer and a thiocarbonylthio compound or RAFT agent.

Yet another aspect of the invention provides a method of making a block polymer from lignin-based monomers and fatty acid- and/or fatty alcohol-based monomers by a polymerization method selected from the group consisting of, but not limited to, living anionic polymerization, living cationic polymerization, ring-opening metathesis polymerization (ROMP), controlled free-radical polymerization [e.g., reversible addition-fragmentation chain-transfer (RAFT) polymerization, atom transfer radical polymerization (ATRP)], group transfer polymerization, Ziegler-Natta polymerization, acyclic diene metathesis polymerization, and polymer-polymer coupling.

Yet another aspect of the invention provides a macroinitiator (first polymer block) that enables the polymerization of a second monomer or combination of monomers toward the synthesis of block polymers, wherein the macroinitiator is comprised of a polymerized lignin-based monomer, a polymerized combination of two or more different lignin-based monomers, a polymerized fatty acid-based monomer, a polymerized combination of two or more different fatty acid-based monomers, a polymerized fatty alcohol-based monomer, a polymerized combination of two or more fatty alcohol-based monomers, or a polymerized combination of one or more fatty acid-based monomers and one or more fatty alcohol-based monomers and wherein the monomers or combination of monomers that comprise the macroinitiator (first polymer block) and the second monomer or combination of monomers that are polymerized from the macroinitiator are different from each other.

Another aspect of the invention provides a method of making a block copolymer comprising the steps of a) polymerizing a first monomer or mixture of first monomers under conditions effective to obtain a macroinitiator comprised of a first polymer block and b) polymerizing a second monomer or mixture of second monomers in the presence of the macroinitiator under conditions effective to form a second polymer block attached to the first polymer block, wherein the first monomer or mixture of first monomers is different from the second monomer or mixture of second monomers and wherein the first monomer(s) and second monomer(s) are selected from the group consisting of lignin-based monomers, fatty acid-based monomers and fatty alcohol-based monomers. In one embodiment, the first monomer or mixture of first monomers is a lignin-based monomer or mixture of lignin-based monomers and the second monomer or mixture of second monomers is selected from the group consisting of fatty acid-based monomers, fatty alcohol-based monomers, and mixtures thereof. In another embodiment, the first monomer or mixture of first monomers is selected from the group consisting of fatty acid-based monomers, fatty alcohol-based monomers and mixtures thereof and the second monomer or mixture of second monomers is a lignin-based monomer or mixture of lignin-based monomers. The block copolymer thus formed may then be further sequentially reacted (chain-extended) with one or more additional such monomers or mixtures of such monomers to form one or more additional blocks (e.g., an initial A-B block copolymer may be converted to an A-B-A block copolymer, then an A-B-A-B block copolymer, then an A-B-A-B-A block copolymer, and so on). The block copolymers may also be coupled together (for example, two A-B block copolymers may be coupled together through functional groups reactive with each other at each terminus of the B block to form an A-B-A triblock polymer, wherein the B block of the triblock copolymer contains the two coupled B blocks).

A further aspect of the invention provides a method of making a block copolymer comprising the steps of a) polymerizing a first monomer or mixture of first monomers under conditions effective to obtain a first polymer block, b) polymerizing a second monomer or mixture of second monomers under conditions effective to form a second polymer block, and c) coupling the first polymer block and the second polymer block, wherein the first monomer or mixture of first monomers is different from the second monomer or mixture of second monomers and wherein the first monomer(s) and second monomer(s) are selected from the group consisting of lignin-based monomers, fatty acid-based monomers and fatty alcohol-based monomers. In one embodiment, the first monomer or mixture of first monomers is a lignin-based monomer or mixture of lignin-based monomers and the second monomer or mixture of second monomers is selected from the group consisting of fatty acid-based monomers, fatty alcohol-based monomers, and mixtures thereof. In another embodiment, the first monomer or mixture of first monomers is selected from the group consisting of fatty acid-based monomers, fatty alcohol-based monomers and mixtures thereof and the second monomer or mixture of second monomers is a lignin-based monomer or mixture of lignin-based monomers.

These and other features of the present invention will be described in more details below in the detailed description of the invention and in conjunction with the following figures.

DESCRIPTION OF THE FIGURES

The present invention is illustrated by way of example, and not by way of limitation, in the figures of the accompanying drawings and in which.

DETAILED DESCRIPTION OF THE INVENTION

Figure 1:
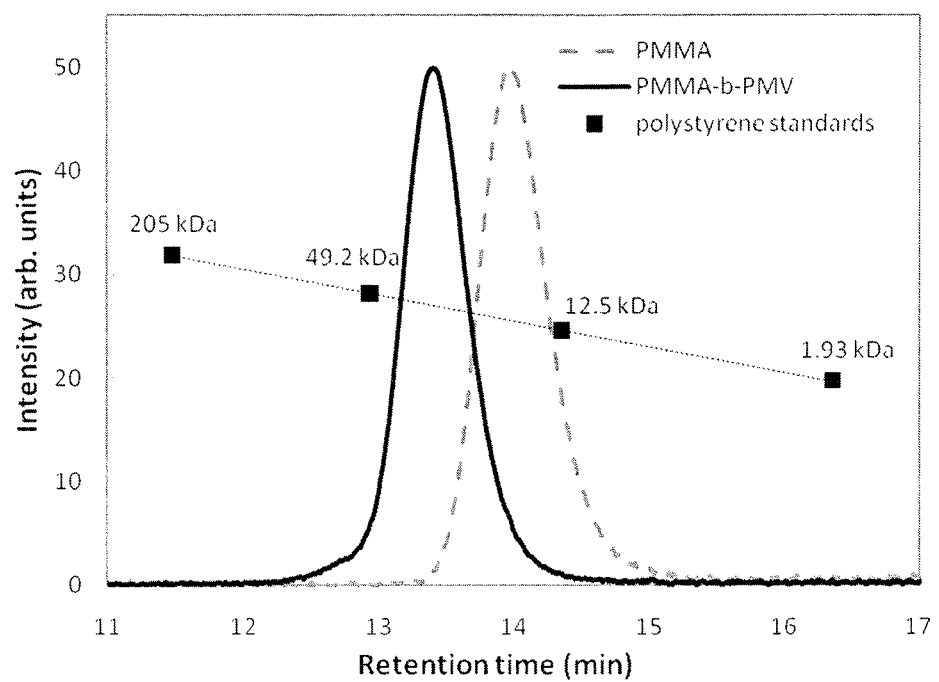
FIG. 1 shows gel permeation chromatography (GPC) data for a poly(methyl methacrylate)-b-poly(methacrylated vanillin) (PMMA-b-PMV) diblock copolymer and its PMMA macroinitiator precursor that were both produced by RAFT synthesis.

The present invention will now be described in detail with reference to a few preferred embodiments thereof. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure unnecessarily the present invention.

The block polymers described herein have suitable physical and chemical properties to be employed in a wide range of applications while also being substantially free of petroleum-based products. Applications include, but are not limited to, thermoplastic elastomers (TPE)s, pressure-sensitive adhesives (PSA)s, blend compatibilizers, and devices that require phase-separated nanostructures (e.g., lithographic devices, electronic devices, photovoltaic devices, separation membranes, drug-delivery vehicles, and templates for data storage). Such block polymers are not only sustainable in terms of renewable sources of monomers, but they also may impart a considerable benefit to the environment by reducing toxicity and carbon footprint. Block polymers based on monomers of functionalized lignin-derived molecules or functionalized lignin model compounds (A-monomer) and functionalized fatty acids or functionalized fatty alcohols (B-monomer) derived from plant or animal oils, waxes, or fats are attractive for a myriad of reasons as discussed previously.

The lignin-based monomers are aromatic molecules that can be obtained by the selective depolymerization of lignin harvested from lignocellulosic biomass. Lignin model compounds that imitate the structure of the lignin-derived monomers also can be derived from petroleum. Such structures may include, but are not limited to, phenols, cresols, xylenols, guaiacols, catechols, eugenols, syringols, vanillin and their acid derivatives (e.g., phenol, 2-ethylphenol, 3-ethylphenol, 4-ethylphenol, 4-propylphenol, o-cresol, m-cresol, p-cresol, 2,6-dimethylphenol, 2,4-dimethylphenol, guaiacol, creosol, 6-ethylguaiacol, 4-ethylguaiacol, 4-propylguaiacol, catechol, 6-methylcatechol, 4-methylcathecol, 6-ethylcatechol, 4-ethylcatechol, 3-methoxycatechol, isoeugenol, eugenol, syringol, vanillin, etc.). These molecules can be further functionalized to form a spectrum of possible lignin-based reactive monomers, which include, but are not limited to, aromatics with methacrylate, acrylate, maleic, allyl, hemiacetal, acetal, imine, amine, hydroxyl, methoxy, alkyl, alkenyl, acrylamide, cyanate ester, carboxyl, ether, carbonyl, aldehyde, azide, cyanate, isocyanate, nitrile, thiol, sulfide, disulfide, ester, sulfoxide, or epoxy functional groups and combinations thereof. For example, vanillin can be reacted with methacrylic anhydride, as demonstrated by Stanzione et al., *Green Chem.*, 2012, 14, 2346, hereby incorporated by reference in its entirety, and Stanzione et al., *ChemSusChem*, 2012, 5, 1291, hereby incorporated by reference in its entirety, to produce methacrylated vanillin (MV, 3-methoxy-4-methacryloyloxybenzaldehyde). Additionally, guaiacol and eugenol can be reacted with methacrylic anhydride, as demonstrated by Stanzione et al., *ChemSusChem*, 2012, 5, 1291, hereby incorporated by reference in its entirety, to produce methacrylated guaiacol (2-methoxyphenyl methacrylate) and methacrylated eugenol (4-allyl-2-methoxyphenyl methacrylate). Moreover, phenol, creosol, 4-ethylguaiacol, 4-propylguaiacol, catechol, and 4-methylcatechol can be reacted with methacrylic anhydride, as demonstrated by Stanzione et al., *ACS Sustainable Chem. Eng.*, 2013, 1, 419, hereby incorporated by reference in its entirety, to produce methacrylated versions thereof, as shown in Scheme 1.

Scheme 1

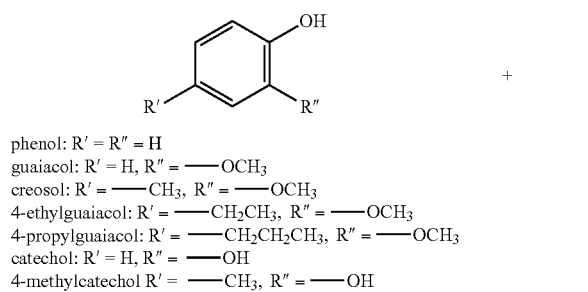

phenol: R' = R'' = H
guaiacol: R' = H, R'' = ––OCH$_3$
creosol: R' = ––CH$_3$, R'' = ––OCH$_3$
4-ethylguaiacol: R' = ––CH$_2$CH$_3$, R'' = ––OCH$_3$
4-propylguaiacol: R' = ––CH$_2$CH$_2$CH$_3$, R'' = ––OCH$_3$
catechol: R' = H, R'' = ––OH
4-methylcatechol R' = ––CH$_3$, R'' = ––OH

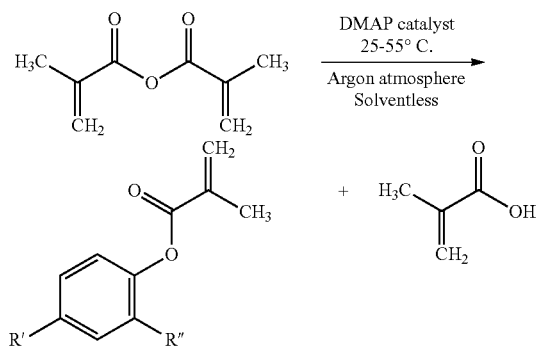

1: R' = R'' = H
2: R' = H, R'' = ––OCH$_3$
3: R' = ––CH$_3$, R'' = ––OCH$_3$
4: R' = ––CH$_2$CH$_3$, R'' = ––OCH$_3$
5: R' = ––CH$_2$CH$_2$CH$_3$, R'' = ––OCH$_3$
6: R' = H, R'' = ––OCOCCH$_2$CH$_3$
7: R' = ––CH$_3$, R'' = ––OCOCCH$_2$CH$_3$

Similar chemistries including, but not limited to, methacrylation via reaction with methacryloyl chloride, methacrylic acid, and methyl methacrylate; acrylation via reaction with acrylic acid, acryloyl chloride, and methyl acrylate; allylation via reaction with vinyl-alkyl halides, vinyl-alkyl esters, vinyl-alkyl acids, and vinyl-alkyl anhydrides; and maleination via reaction with maleic anhydride can be employed to incorporate polymerizable functionality in all lignin-based phenolics. Functionalization chemistries also may be applied to aldehyde functionalities in vanillin-based units. Example chemistries involving aldehyde functionalities that allow tuning of properties include, but are not limited to, conversion to acetal functionalities by reaction with alcohols (e.g., methyl hemiacetal or dimethyl acetal from methanol, ethyl hemiacetal or diethyl acetal from ethanol), imine functionalities by reaction with amines (e.g., hexylimine from hexylamine), or hydroxyl functionalities via reduction chemistries (i.e., reduction of an aldehyde functional group to a hydroxyl group).

The fatty acid- or fatty alcohol-derived monomers may be based on molecules derived from plant oils, fats, or waxes and/or animal oils, fats, or waxes, such as plant oil triglycerides. Readily available sources include, but are not limited to, almond seed oil, arachis (groundnut) oil, canola oil, castor oil, catnip oil, cedarwood oil, citronella oil, coconut oil, coprah oil, corn oil, cottonseed oil, garlic oil, grape seed oil, hazelnut oil, hemp oil, jojoba oil, kukui oil, linseed oil, neem oil, olive oil, palm oil, palm kernel oil, peanut oil, perilla oil, poppy seed oil, rapeseed oil, rice bran oil, safflower oil, sesame oil, soja oil, soybean oil, sunflower oil, tall oil, tung oil, walnut oil, wheat germ oil, jatropha oil, millettia oil, pongamia oil, fish oil, avocado oil, blackcurrant oil, borage seed oil, cacao (cocoa butter), evening primrose oil, duck fat, lard, butter, tallow, vernonia oil, yellow grease, camelina oil, carthame oil, and beeswax. The triglycerides can be broken down to fatty acids and fatty alcohols. The fatty acids may include, but are not limited to, C3 to C26 fatty acids such as propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, laccroic acid, psyllic acid, geddic acid, ceroplastic acid, hexatriacontylic acid, ricinoleic acid, the unsaturated analogues of these acids (which may be mono- or polyunsaturated, including, for example, myristoleic acid, palmitoleic acid, sapienic acid, elaidic acid, vaccenic acid, linoelaidic acid, arachidonic acid, eicosapentaenoic acid, erucic acid, docosahexaenoic acid, oleic acid, linoleic acid, and linolenic acid), the saturated and unsaturated alcohols analogous to these acids (wherein the carboxylic acid group is replaced by a hydroxyl group), and combinations thereof. The fatty acids and fatty alcohols may be branched or straight chain. The fatty acids may bear one or more hydroxyl groups along a hydrocarbon chain. The fatty acid may be a short chain fatty acid (containing fewer than 6 carbon atoms per molecule), a medium chain fatty acid (containing 6 to 12 carbon atoms per molecule), a long chain fatty acid (containing 13 to 21 carbon atoms per molecule), or a very long chain fatty acid (containing 22 or more carbon atoms per molecule), or a combination of two or more of these different types of fatty acids.

As described herein, the term "triglyceride" refers to a derivative of glycerol in which all three available hydroxyl groups are esterified by various fatty acids, as represented by Formula (I):

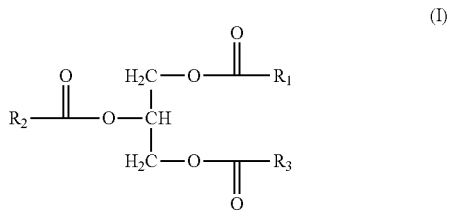

(I)

The groups $R_1$, $R_2$, and $R_3$ may be independently selected from various hydrocarbon chains derived from fatty acids. The hydrocarbon chains have from between 1 and 36 carbon atoms, most preferably from 11 to 21 carbon atoms. The number of unsaturated carbon-carbon bonds in each R group may vary from 0 to 3, preferably 0 or 1. For example, the structure of a typical soy oil triglyceride is shown in Formula II, wherein the level of carbon-carbon bond unsaturation is 5 per triglyceride.

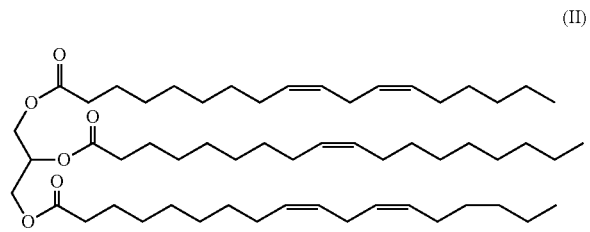 [SMILES: CCCCC/C=C\C/C=C\CCCCCCCC(=O)OCC(COC(=O)CCCCCCC/C=C\C/C=C\CCCCC)OC(=O)CCCCCCC/C=C\CCCCCCCC]

(II)

The functionalization of the plant oil triglycerides and fatty acids/alcohols to form useful monomers for polymerization is disclosed in U.S. Pat. No. 6,121,398 by Wool et al. hereby incorporated by reference in its entirety for all purposes, and in U.S. Pat. No. 7,524,909 B2 by Palmese et al., hereby incorporated by reference in its entirety for all purposes. Such reactions may include, but are not limited to, epoxidation, acrylation, methacrylation, transesterification, maleination, allylation and monoglycerolysis.

For example, a fatty alcohol may be functionalized using chemistries such as methacrylation via reaction of the hydroxyl group with methacryloyl chloride, methacrylic acid, and methyl methacrylate; acrylation via reaction of the hydroxyl group with acrylic acid, acryloyl chloride, and methyl acrylate; allylation via reaction of the hydroxyl group with vinyl-alkyl halides, vinyl-alkyl esters, vinyl-alkyl acids, and vinyl-alkyl anhydrides; and maleination via reaction of the hydroxyl group with maleic anhydride. Such chemistries can be employed to incorporate polymerizable functionality. The carboxylic acid group of a fatty acid may, for example, be (meth)acrylated using glycidyl (meth)acrylate to provide a (meth)acrylated fatty acid-based monomer. (Meth)acrylate functional groups may also be introduced into an unsaturated fatty acid by first epoxidizing unsaturated sites on a fatty acid methyl ester and then reacting the epoxy groups with (meth)acrylic acid. Allyl alcohol may be reacted with a triglyceride to provide allyl-functionalized fatty acid-based monomers.

Block polymers may be polymerized from the lignin-based and fatty acid/alcohol-derived monomers by adaptation of a number of known polymerization methods. A preferred polymerization method is living polymerization in which the ability of a growing polymer chain to terminate prematurely has been removed. Living polymerization is a popular method for synthesizing block polymers since the polymer can be synthesized in stages, each stage containing a different monomer or combination of monomers. Additional advantages are predetermined molar mass and molar mass dispersity and control over end-group functionality.

Exemplary suitable polymerization techniques for block polymer synthesis in accordance with the present invention are, without limitation, living anionic polymerization, living cationic polymerization, ring-opening metathesis polymerization (ROMP), controlled free-radical polymerization, group transfer polymerization, living Ziegler-Natta polymerization, and acyclic diene metathesis polymerization. Polymer-polymer coupling also can be an advantageous route toward the generation of block polymers in accordance with the present invention. For example, polymer blocks may be separately prepared wherein a first polymer block bears a functional group reactive with a functional group on a second polymer block, wherein the two functional groups react with each other when the first and second polymer blocks are combined under conditions effective to achieve reaction of the functional groups, thereby coupling the polymer blocks to each other and forming a block copolymer. The polymer blocks that are coupled may be the same as or different from each other. Coupling techniques using functionalized linking agents which serve to link together two or more polymer blocks may also be utilized. Linking agents containing three or more functional groups reactive with functional groups on polymer blocks may be used to provide star or radial type block copolymers, the polymer blocks being coupled together through the linking agent.

A more preferred method of polymerization is controlled free-radical polymerization, which allows the development of block polymers using free radical chemistry. These techniques may involve catalytic chain-transfer polymerization, initiator-mediated polymerization, stable free-radical mediated polymerization (SFRP), atom transfer radical polymerization (ATRP), reversible addition-fragmentation chain-transfer (RAFT) polymerization, and iodine-transfer polymerization. Of these techniques, RAFT polymerization is preferable due to ease of implementation and classification as a sustainable polymerization technique.

A RAFT polymerization process is generally carried out in the presence of a chain-transfer agent (CTA) and a radical initiator. Thus, in one aspect of the invention a first polymer block is prepared by reacting a lignin-based monomer (or mixture of lignin-based monomers) or a fatty acid-based monomer or fatty-alcohol-based monomer [or mixture of fatty acid-based monomer(s) and/or fatty alcohol-based monomer(s)] in the presence of a chain-transfer agent (CTA) and a radical initiator under conditions effective to cause polymerization of the monomer(s). Once the first polymer block is formed (thereby providing a macroinitiator, according to one aspect of the invention), a monomer or mixture of monomers different from that used to prepare the first polymer block may be introduced and polymerization continued to form a second polymer block. The CTA is typically a thiocarbonylthio compound, such as a dithioester, thiocarbamate or xanthate. A preferred CTA is 2-cyano-2-propyl benzodithioate for its commercial availability and ability to polymerize methacrylates readily, but difunctional or multifunctional CTAs that permit divergent or convergent polymerization also may be of interest, especially for generating symmetric A-B-A and B-A-B triblocks; A-B-A-B-A, B-A-B-A-B, C-B-A-B-C, and A-B-C-B-A tetrablocks; or additional types of multiblock polymers. While not limited to the referenced compounds, a number of other CTAs that may be used in RAFT polymerization processes are compiled in Barner-Kowollik's "Handbook of RAFT Polymerization," (2008, Wiley), hereby incorporated by reference in its entirety. Numerous radical initiators also exist (e.g., benzoyl peroxide, potassium persulfate, methyl ethyl ketone peroxide, cumyl hydroperoxide, etc.), but azobisisobutyronitrile (AIBN) is most common. In one embodiment of the invention, the radical initiator is selected from the group consisting of peroxides and azo compounds.

Figure 3:
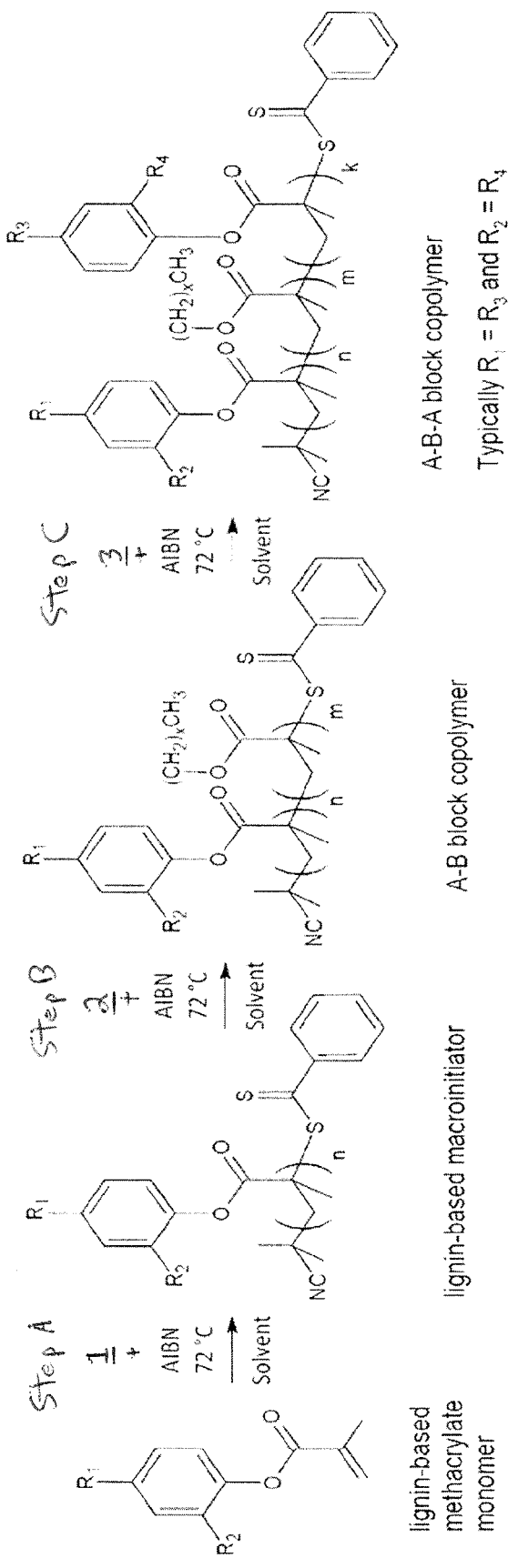
FIG. 3 shows an exemplary RAFT polymerization scheme for preparing A-B-A triblock copolymers from lignin-based and fatty acid-based methacrylate monomers.

Scheme 2 (FIG. 3) illustrates one possible approach towards the RAFT polymerization of block polymers. The approach in Scheme 2 shows a linear pathway, with chain-extension of a B-block from an A-block macroinitiator to generate an A-B diblock copolymer. Another A-block is subsequently chain-extended from the A-B macroinitiatior to generate an A-B-A triblock polymer. The second A-block need not be identical to the first A-block in composition, molecular weight, or functionality, i.e., n does not necessarily equal k, $R_1$ does not necessarily equal $R_3$, and $R_2$ does not necessarily equal $R_4$. $R_1$, $R_2$, $R_3$ and $R_4$ may be hydrogen, methyl, methoxy, ethyl and other such substituents found in aromatic compounds derived from lignin. The synthesis of lignin- and fatty acid-based block polymers need not be limited to the RAFT polymerization in Scheme 2, but also may employ the polymerization or polymer-polymer coupling approaches mentioned previously.

In Step A of Scheme 2, a lignin-based methacrylate monomer is polymerized by heating in the presence of the chain transfer agent 2-cyano-2-propyl benzodithioate (designated as 1 in FIG. 3) and the radical initiator azobisisobutyronitrile (AIBN) to form a lignin-based macroinitiator (containing an A block). In Step B of Scheme 2, the lignin-based macroinitiator is further reacted (chain-extended) with a methacrylate-functionalized fatty alcohol (designated as 2 in FIG. 3), having the general structure $H_3C(CH_2)_xOC(=O)C(CH_3)=CH_2$ where x is an integer of from 2 to 24, for example) to form an A-B block copolymer, the methacrylate-functionalized fatty alcohol having polymerized to provide a B block. In Step C, the A-B block copolymer is again chain-extended with a lignin-based methacrylate monomer (designated as 3 in Scheme 2), which may be the same as, or different from, the lignin-based methacrylate monomer used in the first step to prepare the first A block.

In designing the bio-based block polymers, molecular weight, chemical composition (which relates to the Flory-Huggins interaction parameter), molecular architecture [including, but not limited to, A-B, A-B-A (or A-B-B-A), B-A-B (or B-A-A-B), A-B-A-B, B-A-B-A, A-B-A-B-A, or B-A-B-A-B block polymers], and the relative volume of each polymer block are variables in the design because they significantly affect the resulting phase-separated morphologies. Phase separation occurs when the A- and B-blocks are thermodynamically immiscible. By careful selection of which types of monomers or combinations of monomers compose each polymer block, the thermal properties, mechanical properties, and morphology may be tuned.

Block polymer TPEs and PSAs are typically constructed with A-B-A or A-B-A-B-A architecture and are preferably nanostructured such that the A-type hard phase separates into spheres (or other nanoscale structures) immersed in the soft B-type matrix. Other nanoscale morphologies include, but are not limited to, lamellae, gyroid, hexagonally packed cylinders, perforated lamellae and spheres. The B-type matrix is elastomeric, and the A-type hard phase acts as physical crosslinks. Because the crosslinks are physical and not chemical, these materials can be remelted and remolded. This property is important for the ready recyclability of thermoplastics, in contrast to permanently crosslinked rubbery materials that cannot be recycled readily. Additionally, since the thermoplastic elastomers may contain esters or ethers that possess susceptible carbon-oxygen bonds, they may be readily biodegraded under certain environmental conditions.

EXAMPLES

Example 1

PMV Synthesis and Characterization

Lignin-based poly(methacrylated vanillin) [(PMV, poly (3-methoxy-4-methacryloyloxybenzaldehyde)] homopolymers and macroinitiators were synthesized by RAFT polymerization, a controlled free-radical polymerization technique. The methacrylated vanillin monomer was made by reacting vanillin with methacrylic anhydride using a catalytic amount of 4-dimethylaminopyridine. To a round-bottom flask equipped with a magnetic stir bar, a catalytic amount of 4-dimethylaminopyridine (2 mol % of methacrylic anhydride) was added to vanillin (20 g). Prior to adding 1.05 vanillin equivalents (adjustable to as low as 1.01) of methacrylic anhydride to the flask, the flask was sealed and subsequently purged with argon gas for an hour to remove moisture and oxygen from the reaction vessel. For the first three hours with stirring, the reaction progressed at room temperature. The flask was placed in a 55° C. silicone oil bath for a minimum of 24 hours. The reaction mixture was then cooled to room temperature and diluted with methylene chloride (150 mL) (ethyl acetate was also used as a "greener" substitute). To remove unreacted methacrylic anhydride and vanillin and to remove the methacrylic acid byproduct, the organic phase was washed repeatedly with a saturated sodium bicarbonate aqueous solution (150 mL) until carbon dioxide was no longer evolved. The organic phase was then washed with 1.0 M $NaOH_{(aq)}$ (150 mL), 0.5 M $NaOH_{(aq)}$ (150 mL), 1.0 M $HCl_{(aq)}$ (150 mL), water (150 mL), dried over sodium sulfate, and then concentrated under reduced pressure. The isolated methacrylated vanillin (MV) was further purified via recrystallization in hexanes.

For the RAFT polymerization of methacrylated vanillin, the chain-transfer agent (CTA), 2-cyano-2-propyl benzodithioate, and solvent, 1-4-dioxane, were used as received. Other "greener" solvents such as anisole or methyl ethyl ketone may also work and were tested in block copolymer syntheses. The radical initiator, azobisisobutyronitrile (AIBN), was recrystallized twice from methanol. An aliquot of a stock solution of CTA and AIBN in 1,4-dioxane was added to the MV (typically 1-3 g) to give a molar ratio of 1:0.1:114 CTA:AIBN:MV. The reactant mixture was diluted to 1:2 MV:1,4-dioxane by volume, degassed using three freeze-pump-thaw cycles, and repressurized with argon.

The sealed vessel, equipped with a stir bar, was suspended in a stirring silicone oil bath preheated to 72° C. Aliquots were taken every ~2 h to monitor the reaction progress by freezing the vessel in liquid nitrogen and, after thawing and while under argon flow, extracting ~0.1 mL of sample. Reactions were typically stopped at 80% monomer conversion (~13 h), but ≥90% monomer conversions were obtainable. The resultant PMV polymers were washed 3 times with n-hexane to remove residual MV monomer, dried, and characterized. Proton nuclear magnetic resonance spectroscopy ($^1$H NMR) confirmed the reactive aldehyde functionality in the materials was conserved as long as methanol was not used in the washes, in which case some (~20 mol %) of the aldehyde groups were converted to dimethyl-acetyl groups.

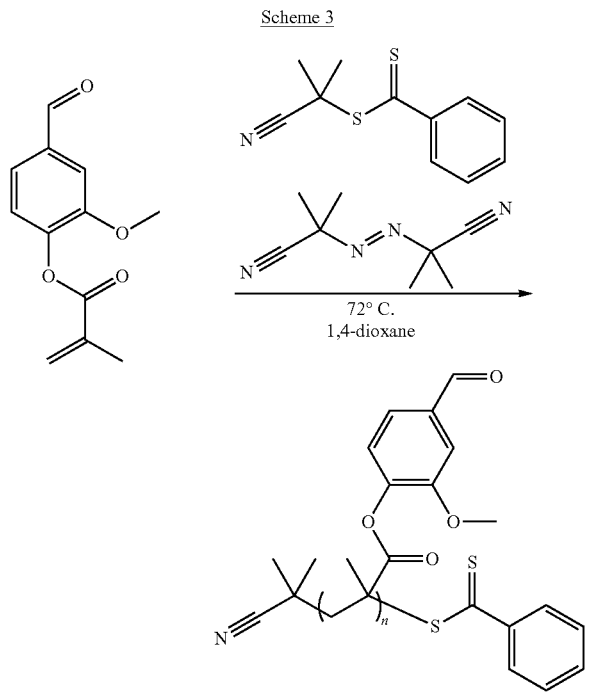

Scheme 3

This process allowed the formation of PMV blocks, shown by Scheme 3, of low to high molecular weight with a controlled molecular weight and a low dispersity (s). GPC data for these polymers, which gives peaks that evolve with time during the RAFT polymerization process, were published in Holmberg et al., *ACS Sustainable Chem. Eng.*, 2014, DOI: 10.1021/sc400497a (incorporated herein by reference in its entirety for all purposes). The polymers had number-average molecular weights ranging from approximately from 12 kDa to 25 kDa as referenced to polystyrene standards, but higher molecular weights can be realized by using larger amounts of MV relative to CTA or by running the reactions longer and to higher conversions. The polymerizations proceeded in a controlled manner; however, the CTA was somewhat inefficient at initiating MV monomers. Other CTAs, reaction temperatures, AIBN concentrations, or solvent systems should provide a remedy to this slight deviation from ideal behavior (i.e., inefficient monomer initiation).

The PMV block is quite rigid with properties similar to or better than polystyrene, the hard component in most commercial petroleum-based thermoplastic elastomers (TPEs). The thermal properties of the PMV block were probed using differential scanning calorimetery (DSC) experiments, as reported in Holmberg et al., *ACS Sustainable Chem. Eng.*, 2014, DOI: 10.1021/sc400497a. These DSC experiments showed that a PMV block with 20 mol % dimethyl acetal groups has a glass transition temperature ($T_g$) of 112° C., which is higher than that of PS with $T_g$=100° C. PMV with no dimethyl acetal groups had a $T_g$ of 120° C. These high $T_g$ values ensure rigidity at room temperature with a tensile modulus (E) on the order of 2 GPa. Further, the aldehyde functionality in the monomeric repeat units of the PMV allows for additional chemistries, such as the dimethylacetylation that occurred during the methanol washes, to tune the $T_g$ or other thermal and mechanical properties. Implementing other lignin-based monomers aside from vanillin, combinations of lignin-based monomers, other functionalities aside from the demonstrated aldehyde, methoxy, and dimethyl-acetal groups, or combinations of functionalities, would also provide means for tuning properties.

Additional PMV homopolymers and their characteristics were published by Holmberg et al. in *ACS Sustainable Chem. Eng.*, 2014, DOI: 10.1021/sc400497a, hereby incorporated by reference in its entirety.

Example 2

PMMA-b-PMV Synthesis and Characterization

To demonstrate that lignin-based MV could be polymerized into an A-B diblock copolymer, poly(methyl methacrylate) (PMMA) was used as the initiating block. Here, 0.25 g (0.015 mmol) of a PMMA macroinitiator (16.2 kDa, grown from 2-cyano-2-propyl benzodithioate, Đ=1.07), 0.382 g (1.73 mmol) of MV, and 5 mg (0.03 mmol) of AIBN were dissolved in 1.5 mL of 1,4-dioxane. The resulting solution was degassed using three freeze-pump-thaw cycles, repressurized with argon, and suspended in a preheated 70° C. oil bath. After 15 h (81% conversion), the viscous solution was diluted with tetrahydrofuran (THF), crashed into stirring methanol, redissolved in THF, crashed into n-hexane, and washed once more with methanol. Despite the methanol washes, the aldehyde functionality in this material was completely preserved. The GPC results are shown in FIG. 1 for both the PMMA precursor and the final PMMA-b-PMV diblock copolymer formed during the RAFT synthesis. The resulting diblock number-average molecular weight ($M_n$), weight-average molecular weight ($M_w$), and dispersity (Đ) are shown in Table 1.

TABLE 1

Average molecular weights referenced to polystyrene standards and dispersity for PMMA and PMMA-b-PMV.

| | $M_n$ (kDa) | $M_w$ (kDa) | Đ |
|---|---|---|---|
| PMMA | 17.0 | 18.2 | 1.07 |
| PMMA-b-PMV | 29.9 | 32.2 | 1.08 |

Using $^1$H NMR, the final diblock copolymer was determined to be 30.5 kDa in molecular weight and 47 wt % PMV. This composition is expected to produce a material that phase-separates into lamellar (sheet-like) nanostructures. To prove the equilibrium morphology, the PMMA-b-PMV diblock copolymer was first annealed at 210° C. for 30 h, which melted any structure above $T_g$. It was then slowly cooled back to room temperature and microtomed into 70 nm thick slices. Transmission electron microscopy (TEM) data of the microtomed samples showed parallel dark and light stripes indicative of a lamellar morphology. The dark stripes were PMV, which was selectively stained with ruthenium tetroxide ($RuO_4$). Small-angle X-ray scattering (SAXS) data (collected over 10 h at room temperature and azimuthally integrated) corroborated the lamellar structure. A primary SAXS peak at approximately $q^*$=0.03/Å and higher-order peaks at integer values greater than the primary peak (i.e., 2q*, 3q*, and 4q*) were consistent with first-order Bragg reflections from lamellae with a periodicity of d=23 nm. The narrow breadth of the first-order peak and clear visibility of the higher-order reflections indicated that the system was well ordered.

Example 3

PLM Synthesis and Characterization

Fatty acid-based poly(lauryl methacrylate) (PLM) homopolymers and macroinitiators were synthesized by the RAFT process as shown in Scheme 4.

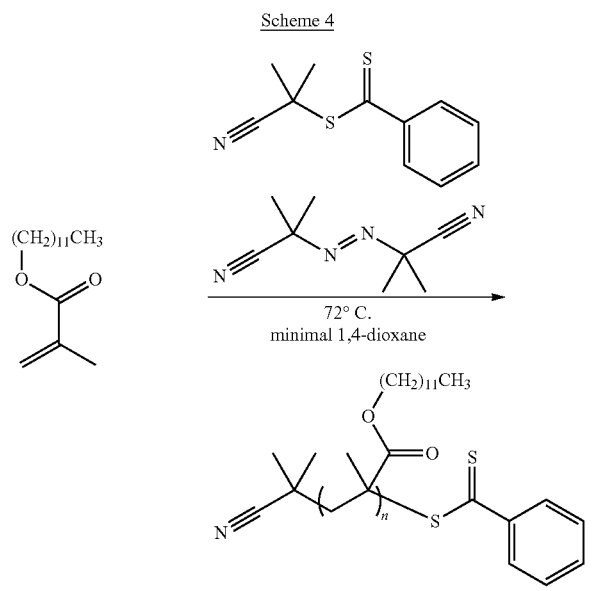

For this synthesis, commercially available lauryl methacrylate (LM) was passed through neutral alumina for purification and added to a mixture of 2-cyano-2-propyl benzodithioate (the CTA) and AIBN for a final reactant ratio of 1:0.1:336 CTA:AIBN:LM. Minimal 1,4-dioxane was added to the reactor to dissolve the AIBN, which was otherwise insoluble in the LM monomer. Other "greener" solvents would also work, such as methyl ethyl ketone or anisole. The vessel was sealed, degassed, refilled with argon, and reacted at 72° C. for 13 h (79% conversion) while aliquots were taken every 2 h. The resultant block polymer precursor (macroinitiator) was washed with methanol three times to remove residual monomer and freeze-dried.

The evolution of the molecular weight of the PLM block was measured by GPC analysis at different reaction times. A secondary peak developed next to the primary peak at long reaction times and corresponded to coupled polymer chains (earlier elution times, larger molecular weights), a byproduct of the reactor having gelled after 4 h. This was prevented in a later synthesis by running the reaction for shorter times or to lower conversions (see Holmberg et al. *ACS Sustainable Chem. Eng.*, 2014, DOI: 10.1021/sc400497a, in which a reactant ratio of 1:0.1:749 CTA:AIBN:LM was implemented and no coupled polymers were produced) or by diluting the reaction mixture with solvent.

The molecular weight increase as a function of monomer-to-polymer percent conversion for PLM was published in Holmberg et al. *ACS Sustainable Chem. Eng.*, 2014, DOI: 10.1021/sc400497a. Molecular weights up to 80,000 g/mol were obtained at monomer conversions of approximately 80%. The syntheses were controlled and the CTA was efficiently consumed during the reaction. The dispersities decreased (or remained approximately constant) with respect to monomer-to-polymer percent conversion and also were published in Holmberg et al. *ACS Sustainable Chem. Eng.*, 2014, DOI: 10.1021/sc400497a. This PLM block is an example of a soft, elastomeric material with a low glass transition and melting temperature. DSC data, as published in Holmberg et al. *ACS Sustainable Chem. Eng.*, 2014, DOI: 10.1021/sc400497a, indicated a $T_m$ at −34° C. This melting transition resulted from the semi-crystallized alkyl side-chains in PLM. The $T_g$ of PLM was overlapped by the melting transition.

Additional details regarding PLM homopolymer synthesis and characterization were published by Holmberg et al., *ACS Sustainable Chem. Eng.*, 2014, DOI: 10.1021/sc400497a, hereby incorporated by reference in its entirety.

Example 4

PMV-b-PLM Synthesis

Figure 2:
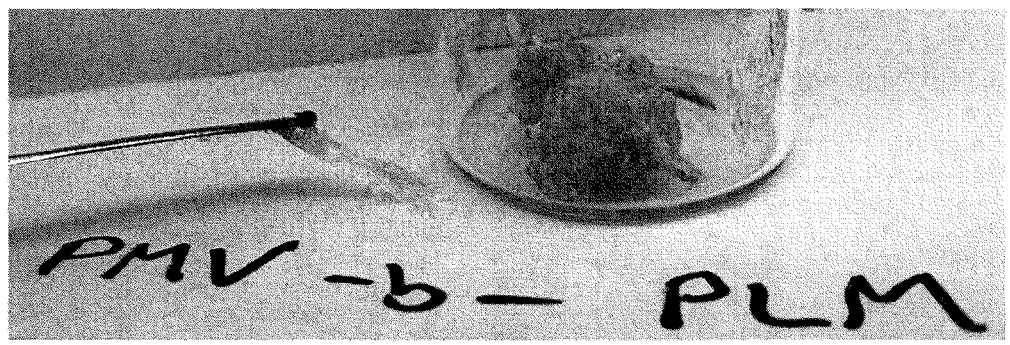
FIG. 2 shows a photograph of poly(methacrylated vanillin)-b-poly(lauryl methacrylate) (PMV-b-PLM) being stretched.

A lignin-based and fatty acid-based diblock copolymer, poly(methacrylated vanillin)-b-poly(lauryl methacrylate) (PMV-b-PLM), was prepared by RAFT polymerization, where the PLM was chain-extended from the PMV macroinitiator synthesized in Example 1. Specifically, a PMV precursor synthesized by RAFT polymerization (21,000 g/mol, Đ=1.16, analogous to Example 1) was dissolved in anisole and AIBN (mol ratio of 1:0.1 PMV:AIBN). Lauryl methacrylate, purified using neutral alumina, was added to the vigorously stirring reaction mixture, which caused the PMV to precipitate. Methyl ethyl ketone (MEK) was added to the mixture until the reactor contents regained transparency (0.24:1.5:6.7:2.0 PMV:LM:anisole:MEK by volume), at which point the mixture was degassed by sparging with argon for 30 min. This mixture was reacted for 6 h (68% conversion) and washed twice with methanol without loss of the aldehyde functionality. GPC data was published in Holmberg et al. *ACS Sustainable Chem. Eng.*, 2014, DOI: 10.1021/sc400497a. PMV homopolymer is a solid powder similar to polystyrene, whereas PLM homopolymer, with its low $T_g$, is a highly viscous liquid suited to adhesive applications at room temperature. The PMV-b-PLM is a stretchy material but behaves more like a PSA than a TPE. These characteristics of the diblock copolymer are shown in FIG. 2, which exhibits a photograph of the polymer as it is being stretched.

Additional synthesis and characterization details and another example of a PMV-b-PLM copolymer, including its nanoscale phase-separation, can be found in Holmberg et al., *ACS Sustainable Chem. Eng.*, 2014, DOI: 10.1021/sc400497a, hereby incorporated by reference in its entirety.

Example 5

PMV-b-PLM-b-PLM-b-PMV Synthesis

RAFT-synthesized PMV-b-PLM diblock copolymers were converted into A-B-A triblock polymers through a combination of aminolysis and thiol-thiol coupling. This approach, shown in Scheme 5, serves as an alternative to chain-extending macroinitiators with monomer, the approach taken in Examples 3 and 4.

Scheme 5

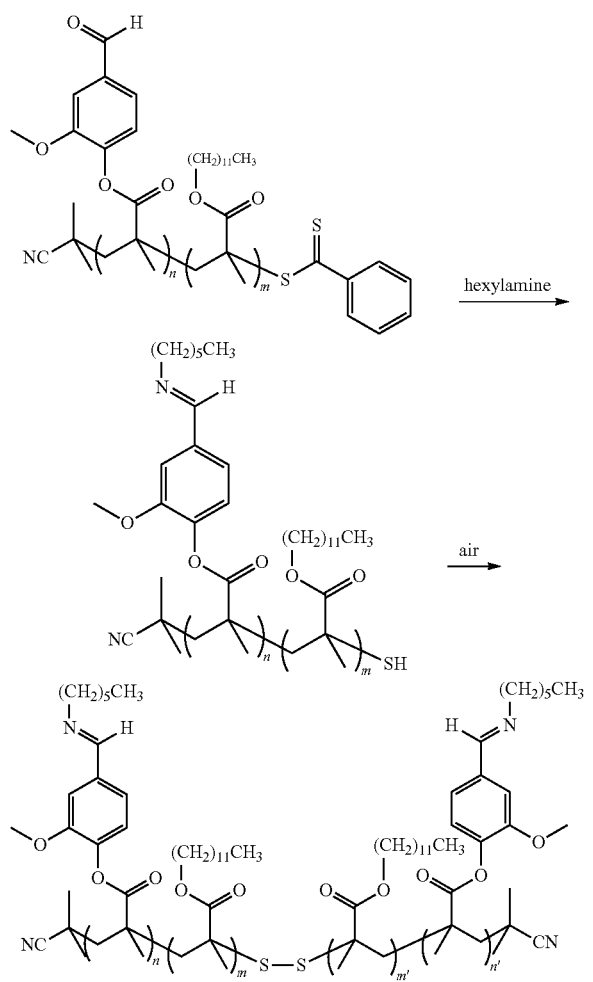

Scheme 6

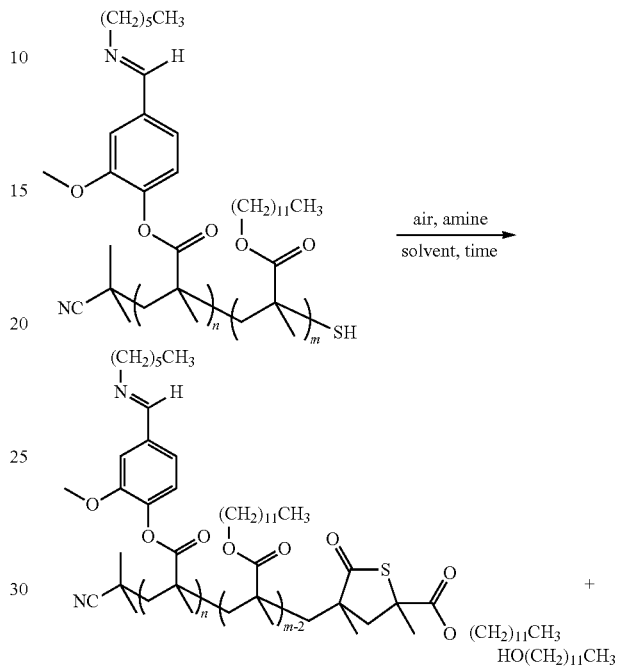

Scheme 4. The multiblock intermediates and some fraction of the triblock (co)polymers were eliminated at long times, presumably due to the formation of thioester rings instead of thiols as depicted in Scheme 6.

As an example, PMV ($M_n$=25,000 g/mol, $M_p$=33,000 g/mol, Đ=1.41) was chain-extended with LM to PMV-b-PLM ($M_n$=72,000 g/mol, $M_p$=130,000 g/mol, Đ=1.65, contains 41 wt PMV overall) using a procedure similar to Example 4. The diblock copolymer (55 mg) was dissolved in tetrahydrofuran (265 mg) and stirred with n-hexylamine (4.1 mg) at room temperature in air. Aliquots were collected after 30 min and 24 h and were characterized by GPC. The GPC data showed a molecular-weight increase between the maxima in the original diblock copolymer and the reacted polymers. This shift in the peak maximum from ~130,000 g/mol to ~140,000 g/mol corresponded to almost all of the aldehyde functionalities in PMV having been converted to hexylimine functionalities, which was confirmed by $^1$H NMR. An increased breadth in the unimodal GCP data between the original and 24-h-reacted samples (Đ of 1.65 to 1.80) came from the formation of high-molecular-weight PMV-b-PLM-b-PMV triblock (co)polymers in the mixture of PMV homopolymer and non-coupled PMV-b-PLM. The aliquot at 30 min was multimodal at early elution times (large molecular weights), representative of multiblock (co)polymers with molecular weights up to ~5 times greater than the hexylimine-functionalized diblock (co)polymers generated and later eliminated at longer reaction times (24 h). An optimum time likely exists for maximizing the amount of triblock (co) polymer or multiblock (co)polymer prepared through

Example 6

PMV-b-PLM-b-PMV Synthesis

The PMV-b-PLM diblock copolymer that was also used in Example 5 was chain-extended with MV to PMV-b-PLM-b-PMV through a RAFT process. This chain-extension was achieved by reacting PMV-b-PLM (86 mg, $M_n$=72,000 g/mol, Đ=1.65, $M_p$=130,000 g/mol, contains 41 wt PMV overall) with MV (35.6 mg) and AIBN (0.04 mg) in a mixture of methyl ethyl ketone (47.7 mg) and anisole (433 mg). The reaction was performed under argon at 72° C. for 18 h and subsequently terminated through rapid cooling. The resultant polymer was collected by precipitation into methanol. GPC data indicated a slight increase in molecular weight and dispersity upon chain-extension ($M_n$ from 72,000 g/mol to 79,000 g/mol, $M_p$ from 130,000 g/mol to 140,000 g/mol, Đ from 1.65 to 1.72) and confirmed that no new homopolymer was formed during the reaction. Characterization by $^1$H NMR indicated an increase in PMV content from 41 wt % to 55 wt %, which corresponds to the addition of a ~7,000-10,000 g/mol PMV block at the end of each PMV-b-PLM chain. Together, these NMR and GCP data confirm the synthesis of a PMV-b-PLM-b-PMV triblock copolymer via RAFT chain-extension.

While this invention has been described in terms of several preferred embodiments, there are alterations, permutations, and substitute equivalents, which fall within the scope of this invention. It also should be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A block polymer comprising at least one A-block and at least one B-block, wherein the A-block contains a polymerized lignin-based monomer or polymerized combination of lignin-based monomers, wherein said lignin-based monomer or monomers have the general formula Ar—O—C(=O)—C(R)=CH$_2$ or Ar—O—C(=O)—C(R)=CHCO$_2$H, where Ar is an aromatic residue obtained from a cresol, a xylenol, a guaiacol, a catechol, a syringol, a vanillin or a combination thereof, and R is H or CH$_3$, and the B-block contains a polymerized fatty acid-based monomer, polymerized fatty alcohol-based monomer or a polymerized combination of fatty acid-based monomer(s) or fatty alcohol-based monomer(s).

2. The block copolymer of claim 1, wherein Ar is obtained from an aromatic residue selected from the group consisting of o-cresol, m-cresol, p-cresol, 2,6-dimethylphenol, 2,4-dimethylphenol, guaiacol, 6-ethylguaiacol, 4-ethylguaiacol, 4-propylguaiacol, catechol, 6-methylcatechol, 4-methylcatechol, 6-ethylcatechol, 4-ethylcatechol, 3-methoxycatechol, syringol, and vanillin and combinations thereof.

3. A block polymer comprising at least one A-block and at least one B-block, wherein the A-block contains a polymerized lignin-based monomer or polymerized combination of lignin-based monomers, wherein said lignin-based monomer or monomers have the general formula Ar—O—C(=O)—C(R)=CH$_2$, where Ar is an aromatic residue obtained from cresol, xylenol, guaiacol, catechol, syringol, vanillin and combinations thereof, and R is H or CH$_3$, and the B-block contains a polymerized fatty acid-based monomer, polymerized fatty alcohol-based monomer or a polymerized combination of fatty acid-based monomer(s) or fatty alcohol-based monomer(s).

4. The block polymer of claim 1, wherein the fatty acid-based monomer(s) or fatty alcohol-based monomer(s) contains at least one hydrocarbon chain of between 1 to 36 carbon atoms.

5. The block polymer of claim 1, wherein the fatty acid-based monomer(s) or fatty alcohol-based monomer(s) contains at least one unsaturated carbon-carbon bond, not necessarily in a hydrocarbon chain, prior to polymerization.

6. The block polymer of claim 1, wherein the fatty acid-based monomer(s) or fatty alcohol-based monomer(s) contains at least one chemical functionality selected from the group consisting of methacrylate, acrylate, maleic, allyl, alkenyl, hydroxyl, and epoxy moieties and combinations thereof, either prior to polymerization or post-polymerization.

7. The block polymer of claim 1, wherein the fatty acid-based monomer(s) or fatty alcohol-based monomers) is derived from at least one of the following: propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, laccoroic acid, psyllic acid, geddic acid, ceroplastic acid, hexatriacontylic acid, ricinoleic acid, the unsaturated analogues of these acids, the saturated and unsaturated alcohols analogous to these acids, and combinations thereof.

8. The block polymer of claim 1, wherein the fatty acid-based monomer(s) or fatty alcohol-based monomer(s) is derived from a triglyceride(s).

9. The block polymer of claim 8, wherein the triglyceride(s) is obtained from a plant or animal.

10. The block polymer of claim 8, wherein the triglyceride(s) is obtained from a plant or animal oil, wax, or fat.

11. The block polymer of claim 1, wherein the block polymer is an A-B block copolymer, an A-B-A block copolymer, an A-B-B-A block copolymer, a B-A-B block copolymer, a B-A-A-B block copolymer, an A-B-A-B block copolymer, a B-A-B-A block copolymer, an A-B-A-B-A block copolymer, or a B-A-B-A-B block copolymer.

12. The block polymer of claim 1, wherein the B-block contains a methacrylate-functionalized fatty alcohol.

13. The block polymer of claim 12, wherein the methacrylate-functionalized fatty alcohol has the general structure H$_3$C(CH$_2$)$_x$OC(=O)C(CH$_3$)=CH$_2$ where x is an integer from 2 to 24.

14. The block polymer of claim 12, wherein the (meth)acrylate-functionalized fatty alcohol is lauryl methacrylate.

15. The block polymer of claim 1, wherein the fatty acid-based monomer, fatty alcohol-based monomer or combination of fatty acid-based monomer(s) or fatty alcohol-based monomer(s) include at least one of a monomer derived from butyric acid, a monomer derived from a saturated or unsaturated alcohol analogous to butyric acid, a monomer derived from lauric acid, or a saturated or unsaturated alcohol analogous to lauric acid.

* * * * *